Patented Nov. 4, 1924.

1,513,934

UNITED STATES PATENT OFFICE.

SAMUEL S. SADTLER, OF SPRINGFIELD, PENNSYLVANIA.

METHOD OF PRODUCING CALCIUM ARSENATE.

No Drawing.   Application filed October 13, 1921. Serial No. 507,554.

*To all whom it may concern:*

Be it known that I, SAMUEL S. SADTLER, a citizen of the United States, and a resident of Springfield Township, in the county of Montgomery and State of Pennsylvania, have invented an Improvement in Methods of Producing Calcium Arsenate, of which the following is a specification.

In the manufacture of calcium arsenate, perhaps more commonly known as arsenate of lime, commercially by the employment of the methods heretofore known it has been impossible to avoid the presence of some soluble arsenic, and even to reduce the content of soluble arsenic present to small or low proportions or quantities has involved a relatively great expense. Furthermore it has been a serious objection to the methods heretofore employed that by their use it has been impossible to obtain a product of invariable grade; that is, a product of uniform grade or quality.

It is one of the objects of my invention to provide a method for the production of calcium arsenate by the employment of which the said product may be cheaply and economically manufactured.

A further object of the invention is to provide a method for the manufacture of calcium arsenate by the employment of which the said product may be produced on a commercial basis for commercial purposes free from soluble arsenic.

It is obvious that a method which may be economically employed commercially to produce calcium arsenate free from soluble arsenic is greatly to be desired.

Other objects and advantages of my invention will be pointed out in the detailed description thereof which follows or will be apparent therefrom.

I have found that by the application of a well known principle of physical chemistry the presence of soluble arsenic may be prevented and avoided and the problem involved successfully solved.

I will first state this application broadly and then will give several examples or illustrations of how the same has been applied and used by me with satisfactory results. It has been discovered by me that if a salt of calcium, more soluble than the calcium arsenate which is produced when solutions of arsenic acid and lime are mixed together, be added or is present in the mixture such salt will tend to protect the calcium arsenate and maintain it as an insoluble salt preventing gradual decomposition upon the keeping of the product and thereby preventing the formation of soluble arsenic.

I have discovered, however, that the application of the principle as above suggested cannot be made without some qualification, and therefore state what appear to me to be the limitations of the same. Certain very soluble calcium salts, such as calcium chloride and calcium nitrate, would, if employed for the purpose as stated, tend to be or might be injurious to plant growth. I therefore would employ some less soluble salt, such as calcium sulphate or calcium sucrate, which is sufficiently more soluble than calcium arsenate to act in a protective way and would have no tendency to be injurious to plant growth. I have discovered that such a salt when added in solution to the arsenic acid and lime, which when mixed together in solution re-act to form the calcium arsenate, does act positively as a protective agent to prevent change in the calcium arsenate thereby preventing the formation of soluble arsenic. Other calcium salts more soluble than the arsenate have been successfully employed by me and therefore I desire to claim and do claim as my discovery the use of a salt of calcium of the character last indicated more soluble than the arsenate to act as a protective agent to prevent the development of soluble arsenic due to the gradual decomposition of the calcium arsenate.

As one example of the manner in which I accomplish the object of my invention I mix with a mixture of solutions of arsenic acid and lime a carbohydrate, preferably cane sugar, which re-acts with one of the ingredients of the said mixture to produce slightly soluble compounds of calcium and in such manner as to prevent the presence of soluble arsenic in the final product. The said product also possesses the further or additional advantage of such stability that no appreciable amount of soluble arsenic will be released or formed therein during the period between its manufacture and use.

In the carrying out or practising of the invention I prepare a water solution of arsenic acid ($AsO(OH)_3$) which solution should contain preferably from fifty-five to sixty per cent of arsenic oxide ($As_2O_5$), although the proportion of arsenic oxide in the solution may be varied through wider limits without departing from the principle of the invention; and also lime in suspension in water. The lime employed should be of as high and pure a grade as is practically possible from a commercial standpoint, being what is known as calcium lime and containing preferably not less than ninety-two per cent of calcium oxide (CaO).

To produce the product, calcium arsenate, sought, three hundred ninety-three (393) c. c. of the arsenic acid solution containing about fifty-eight per cent (58%) of arsenic acid; five hundred and thirty-eight (538) grams of lime, two and a half (2½) liters (2500 c. c.) of water, and twenty (20) grams of a carbo-hydrate such as sucrose (cane sugar), glucose, or the like (preferably the first named), are mixed together. A portion of the water or all if preferred is employed to slake the lime and produce a cream therefrom. The cream of lime thus produced may then be added to the arsenic acid solution or the former may be added to the latter. It makes no difference which of the solutions is added to the other. In either case care must be taken to prevent the generation or formation of an excessive amount of heat. Excessive heating may be prevented by cooling or by adding and mixing the two solutions slowly together. The arsenic acid solution, the lime and the water having been mixed together the carbo-hydrate, preferably cane sugar, is added and thoroughly mixed with the mixture of said solutions. The carbo-hydrate re-acts with portions of the lime to form calcium sucrate which operates to prevent the release or formation of soluble arsenic.

The product produced by mixing the ingredients as aforesaid comprises calcium arsenate in insoluble form in suspension in water. If desired the compounds present in suspension in water may be separated by filtration, pressed into cakes or not as may be preferred, dried, and thereafter disintegrated.

If preferred the water may be separated by filtration, centrifuging, etc., and the carbo-hydrate afterward added, the product thus formed being thoroughly mixed and then dried; or the carbo-hydrate may be added to the mixture of solutions as above described and the water then driven off from the mass by heating.

As the chief object of this invention is to have present an inert, somewhat soluble compound of calcium so that the soluble calcium ions formed from this substance, when the product is mixed with water, act to protect by mass action the calcium arsenate and prevent it from entering into solution, I may use any calcium compound of this character. I have found calcium sulphate to be very desirable for the purpose as it is more soluble than calcium arsenate and yet is not so soluble but that the whole product may be washed with a moderate amount of water in the course of filtration and previous to drying.

The following formula in which calcium sulphate is employed has been used by me with very satisfactory results:—arsenic acid solution (fifty-eight (58) to sixty (60) per cent), three hundred ninety-three (393) c. c.; lime of the character above indicated, five hundred and eighteen (518) grams; calcium sulphate (plaster of Paris) thirty (30) grams; and water (two and a half (2½) liters), twenty-five hundred (2500) c. c. After mixing all of these ingredients carefully so as to avoid an excessive rise in temperature the product is washed with about four (4) liters of water. It is then dried. There is no essential difference between this formula and the one previously described in which carbo-hydrates were employed which form slightly soluble compounds with the excessive lime, except that the product in which calcium sulphate is employed is slightly more stable, being absolutely inert to atmospheric influences. By reason of its stability, its low cost of manufacture and the ease with which it may be washed, I prefer the formula or method in which calcium sulphate is employed to that described in which a carbo-hydrate is employed.

The same problem presents itself with other arsenates and with arsenites, such as those of copper, which often occur as mixed arsenites and arsenates. By the application of the same principle as above described I can protect these compounds by the employment or use of a salt of copper, such as the tartrate, which is somewhat more soluble than the arsenate or arsenite to be rendered or made insoluble.

It is to be understood that the invention is not limited to the precise proportions of the ingredients above mentioned or to the order of their addition, and that changes of the said proportions within reasonable limits and of their order of addition to or introduction into the mixture may be made without departing from the said invention.

It will be seen that a calcium salt, as such, of the character described may be employed or that a substance, capable of reacting with the lime to produce an organic calcium salt may be employed.

Having thus described my invention, what I claim and desire to secure by Letters Patent is:

1. The method of producing calcium arsenate, which comprises the mixing together of a solution of arsenic acid and lime with a third ingredient capable of forming an organic salt of calcium more soluble than calcium arsenate.

2. The method of producing calcium arsenate, which comprises the production of a solution of arsenic acid in water, mixing the same with a mixture of lime and water to form calcium arsenate, and adding thereto a carbo-hydrate to form a calcium compound more soluble than the calcium arsenate to act as a protective means to prevent gradual decomposition of the calcium arsenate and the formation of soluble arsenic.

3. The method of producing calcium arsenate, which comprises the mixing together of a solution of arsenic acid and lime in suspension in water and a carbo-hydrate.

4. The method of producing calcium arsenate, which comprises the mixing together of a solution of arsenic acid and lime in suspension in water and sugar.

5. The method of producing calcium arsenate, which comprises the mixing together of a solution of arsenic acid and lime in suspension in water and cane sugar.

6. The method of producing calcium arsenate, which comprises the production of a solution of arsenic acid in water, mixing the same with a mixture of lime and water, and adding a relatively small proportion of sugar to said mixture.

7. The process of producing a stable calcium arsenate free from soluble arsenic, which comprises mixing together a solution of arsenic acid and lime in suspension in water and maintaining in the presence of the calcium arsenate formed thereby an organic calcium salt more soluble than the arsenate.

8. The method of producing calcium arsenate, which comprises the mixing together of a solution of arsenic acid and a mixture of lime and water with an organic substance capable of reacting with the lime to form an organic salt of calcium more soluble than calcium arsenate.

In testimony that I claim the foregoing as my invention, I have hereunto signed my name this 8th day of October, A. D. 1921.

SAMUEL S. SADTLER.